(12) United States Patent
Chien et al.

(10) Patent No.: US 11,682,275 B2
(45) Date of Patent: Jun. 20, 2023

(54) ELECTRONIC DEVICE WITH AUXILIARY LIGHTING FUNCTION AND OPERATION METHOD THEREOF

(71) Applicants: Po-Yang Chien, Taipei (TW); Wei-Yi Chang, Taipei (TW); Chun-Chieh Chen, Taipei (TW); Chen-Cheng Wang, Taipei (TW)

(72) Inventors: Po-Yang Chien, Taipei (TW); Wei-Yi Chang, Taipei (TW); Chun-Chieh Chen, Taipei (TW); Chen-Cheng Wang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 72 days.

(21) Appl. No.: 17/327,762

(22) Filed: May 24, 2021

(65) Prior Publication Data
US 2021/0383659 A1 Dec. 9, 2021

Related U.S. Application Data

(60) Provisional application No. 63/034,357, filed on Jun. 3, 2020.

(51) Int. Cl.
*G08G 5/00* (2006.01)
*G08B 5/36* (2006.01)
(Continued)

(52) U.S. Cl.
CPC ............ *G08B 5/36* (2013.01); *F21V 33/0052* (2013.01); *G01J 3/506* (2013.01); *G01J 11/00* (2013.01);
(Continued)

(58) Field of Classification Search
CPC ........ G08B 5/36; F21V 33/0052; G01J 3/506; G01J 11/00; G06F 3/04847; G06F 1/1613;
(Continued)

(56) References Cited

U.S. PATENT DOCUMENTS 9,426,346 B2 * 8/2016 Sanchez ................. A45C 15/04
2009/0184905 A1 7/2009 Dai et al.
(Continued)

FOREIGN PATENT DOCUMENTS

| CN | 101162299 | 6/2011 |
|---|---|---|
| TW | 201129092 | 8/2011 |
| TW | 201822525 | 6/2018 |

OTHER PUBLICATIONS

"Office Action of Taiwan Counterpart Application", dated Feb. 10, 2022, p. 1-p. 6.

*Primary Examiner* — Tai T Nguyen
(74) *Attorney, Agent, or Firm* — JCIPRNET

(57) ABSTRACT

An electronic device with an auxiliary lighting function and an operation method thereof are provided. The electronic device includes a first body, a display screen, and a light-emitting module. The first body has a first surface. The first surface includes a screen area and a border area. The border area surrounds the screen area. The display screen is disposed in the screen area of the first body. The light-emitting module is disposed in the border area of the first body. The light-emitting module provides an illumination light in at least one first area of the border area, and provides an indicating light in at least one second area of the border area.

18 Claims, 10 Drawing Sheets

(51) Int. Cl.
*H04N 7/15* (2006.01)
*H04N 7/14* (2006.01)
*G06F 3/04847* (2022.01)
*H04R 1/08* (2006.01)
*G01J 3/50* (2006.01)
*G01J 11/00* (2006.01)
*F21V 33/00* (2006.01)
*G06F 1/16* (2006.01)
*G06F 3/04817* (2022.01)
*H04R 3/00* (2006.01)
*F21W 111/00* (2006.01)

(52) U.S. Cl.
CPC ......... *G06F 3/04847* (2013.01); *H04N 7/142* (2013.01); *H04N 7/15* (2013.01); *H04R 1/08* (2013.01); *F21W 2111/00* (2013.01); *G06F 1/1613* (2013.01); *G06F 3/04817* (2013.01); *H04R 3/00* (2013.01)

(58) Field of Classification Search
CPC ...... G06F 3/04817; H04N 7/142; H04N 7/15; H04R 1/08; F21W 2111/00
USPC .................................................... 340/815.65
See application file for complete search history.

(56) References Cited

U.S. PATENT DOCUMENTS

| | | | |
|---|---|---|---|
| 2013/0201653 A1* | 8/2013 | Shoemake | G06F 1/1626 362/249.05 |
| 2014/0055978 A1* | 2/2014 | Gantz | H04N 5/232935 362/458 |
| 2016/0155391 A1* | 6/2016 | Takesue | G06F 3/1438 345/690 |
| 2020/0081553 A1* | 3/2020 | Sasaki | G06F 3/0425 |

* cited by examiner

ELECTRONIC DEVICE WITH AUXILIARY LIGHTING FUNCTION AND OPERATION METHOD THEREOF

CROSS REFERENCE TO RELATED APPLICATION

This application claims the priority benefit of U.S. provisional application Ser. No. 63/034,357, filed on Jun. 3, 2020. The entirety of the above-mentioned patent application is hereby incorporated by reference herein and made a part of specification.

BACKGROUND OF THE INVENTION

Field of the Invention

The invention relates to an electronic product, and particularly relates to an electronic device with an auxiliary lighting function and an operation method thereof.

Description of Related Art

For a general notebook computer, when a user operates the notebook computer for online meeting functions and the user's character image is captured via an imaging element of the notebook computer, since the user's current operating environment may have insufficient lighting, the image quality of the character image obtained by the imaging element may not be good. In addition, when a user operates a notebook computer for an online meeting function, other people around may unintentionally interfere with the user because they are not aware of the user's operation situation of the notebook computer. In view of the above two issues, the invention provides the several following embodiments of solutions.

SUMMARY OF THE INVENTION

The invention provides an electronic device with an auxiliary lighting function and an operation method thereof that may provide an illumination light, and may also provide a corresponding indicating light according to a display picture content currently displayed on the display screen.

An electronic device with an auxiliary lighting function of the invention includes a first body, a display screen, and a light-emitting module. The first body has a first surface. The first surface includes a screen area and a border area. The border area surrounds the screen area. The display screen is disposed in the screen area of the first body. The light-emitting module is disposed in the border area of the first body. The light-emitting module provides an illumination light in at least one first area of the border area, and provides an indicating light in at least one second area of the border area.

An operation method of the invention is suitable for an electronic device with an auxiliary lighting function. The electronic device includes a first body, a display screen, and a light-emitting module. The display screen is disposed in a screen area of the first body. The light-emitting module is disposed in a border area of the first body. The operation method includes: determining whether an operating system executed by the electronic device executes a conference program; and providing an illumination light in at least one first area of the border area and providing an indicating light in at least one second area of the border area via the light-emitting module, when the conference program is in progress.

Based on the above, the electronic device with an auxiliary lighting function and the operation method thereof of the invention may provide additional auxiliary lighting and provide the indicating light corresponding to the currently displayed display picture via the light-emitting module disposed in the border area around the display screen.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
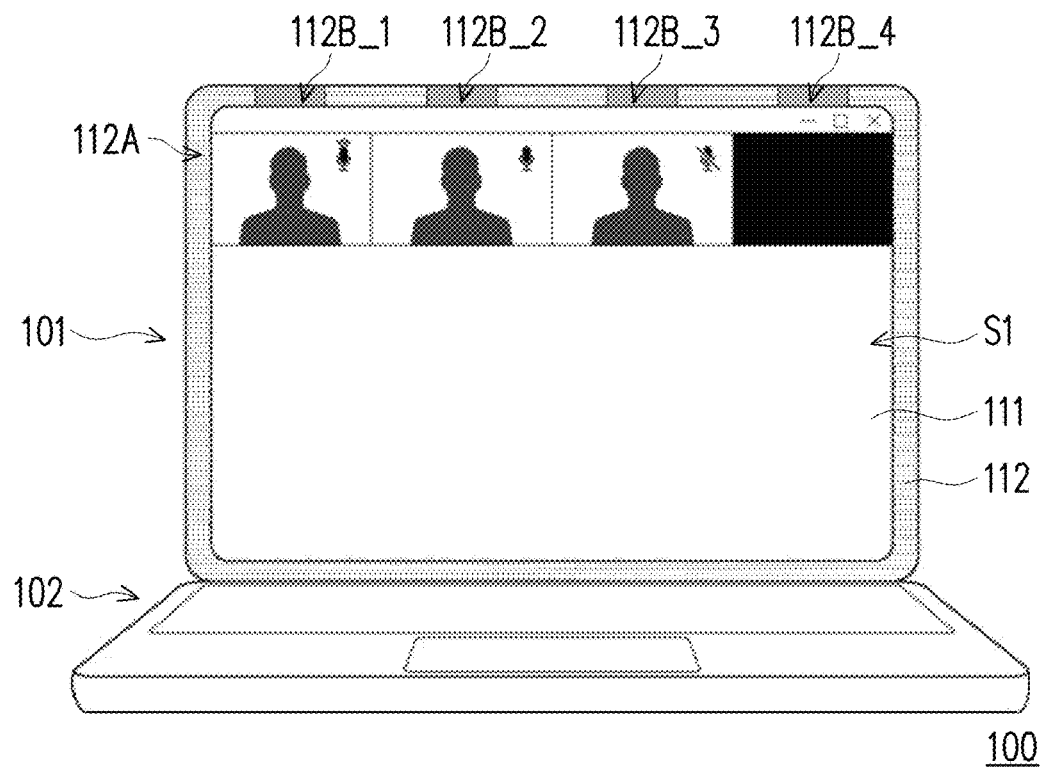
FIG. 1A is a schematic diagram of an electronic device of an embodiment of the invention.

To make the contents of the invention more easily understood, embodiments are provided below as examples of the plausibility of implementation of the disclosure. Moreover, when applicable, devices/members/steps having the same reference numerals in figures and embodiments represent the same or similar parts.

FIG. 1A is a schematic diagram of an electronic device of an embodiment of the invention. Referring to FIG. 1A, an electronic device 100 of the invention may be, for example, a notebook computer, but the invention is not limited thereto. In the present embodiment, the electronic device 100 includes a first body 101 and a second body 102. One side of the first body 101 is pivotally connected to one side of the second body 102. FIG. 1A shows the open state of the first body 101 and the second body 102. In the present embodiment, the first body 101 has a first surface S1 and a second surface. The first surface S1 is located at one side of the first body 101 (for example, the display side of the notebook computer), and the second surface is located at another side of the first body 101 (for example, the LOGO side of the notebook computer). The first surface S1 is parallel to the second surface. In the present embodiment, the first surface S1 includes a screen area 111 and a border area 112, and the border area 112 surrounds the screen area 111. A display screen may be disposed in the screen area 111 of the first body 101. A light-emitting module may be disposed in the border area 112 of the first body 101. In the present embodiment, the light-emitting module may provide an illumination light (auxiliary lighting function) in a first area 112A of the border area 112 (at least one dotted area in the border area 112 as shown in FIG. 1A), and provide an indicating light (auxiliary indicating function) in second areas 112B_1 to 112B_4 of the border area 112.

Figure 1B:
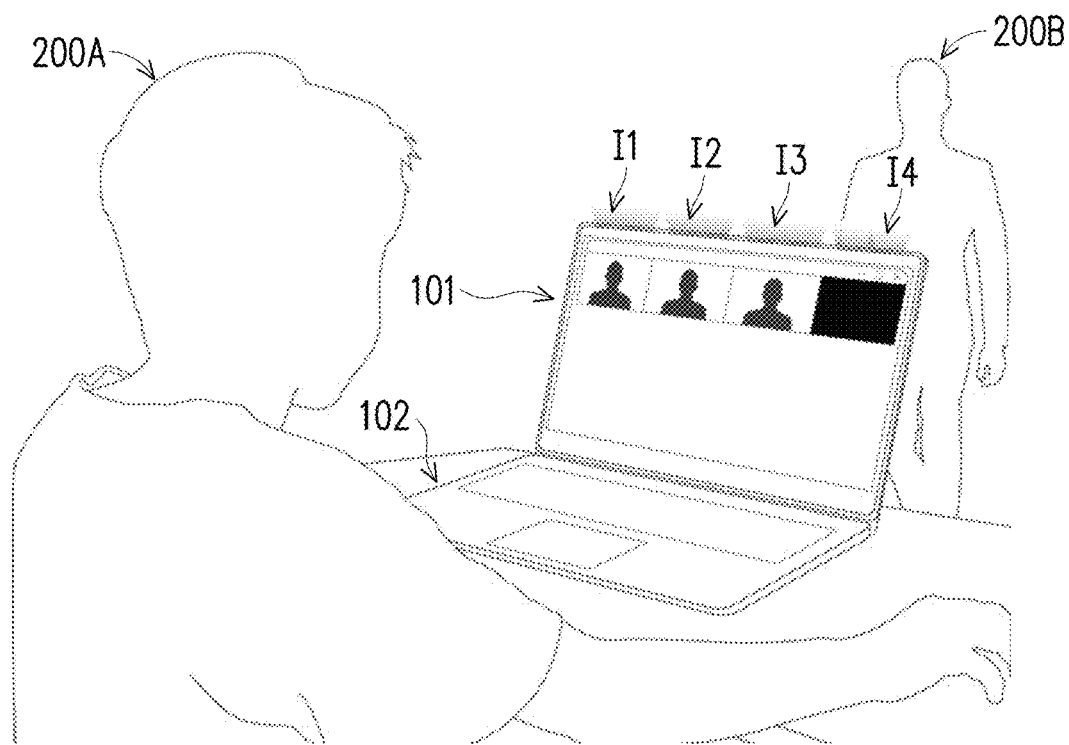
FIG. 1B is a schematic diagram of an operation situation of an electronic device of an embodiment of the invention.

FIG. 1B is a schematic diagram of an operation situation of an electronic device of an embodiment of the invention. Referring to FIG. 1A and FIG. 1B, in an embodiment in which the electronic device 100 executes a conference program, a user 200A may operate the electronic device 100 for a video conference, and the display screen of the electronic device 100 may, for example, display a plurality of character images (i.e., real-time video images). In the embodiment of FIG. 1B, in the first area 112A of the border area 112, the face of the user 200A may be illuminated via an illumination light provided by a plurality of corresponding light-emitting units, so that the conference program may obtain the video image of the user 200A with proper brightness illumination. Indicating lights I1 to I4 may be provided in the second areas 112B_1 to 112B_4 of the border area 112 by a plurality of other corresponding light-emitting units, and the positions of the second areas 112B_1 to 112B_4 of the border area 112 may correspond to the positions of the plurality of character images, wherein the positions of the second areas 112B_1 to 112B_4 may be fixed or may be changed correspondingly with the positions of the plurality of character images, which is described in other embodiments later. In some embodiments of the invention, the illumination light may be white light, and the indicating lights I1 to I4 may be the same or different non-white color lights.

Figure 1C:
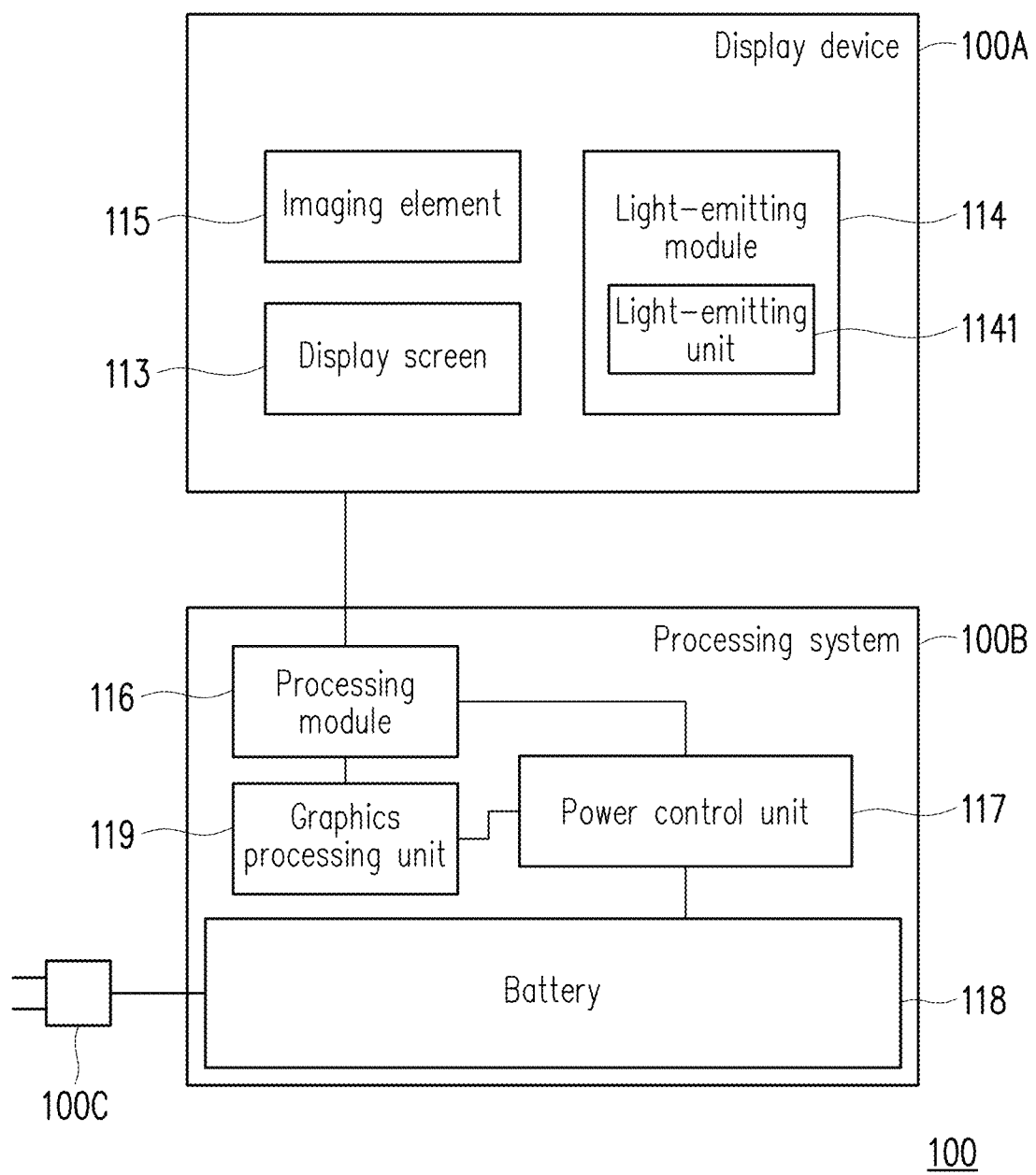
FIG. 1C is a functional block diagram of an electronic device of an embodiment of the invention.

FIG. 1C is a functional block diagram of an electronic device of an embodiment of the invention. Referring to FIG. 1A to FIG. 1C, the electronic device 100 includes a display device 100A and a processing system 100B. The display device 100A may be disposed in the first body 101, and the processing system 100B may be disposed in the second body 102, but the invention is not limited thereto. In some embodiments of the invention, the mounting positions of the display device 100A and the processing system 100B in the electronic device 100 may be determined by the type of the electronic device 100. In the present embodiment, the display device 100A may include a display screen 113, a light-emitting module 114, an imaging element 115, a display driver circuit, and an imaging driver circuit. The light-emitting module 114 may include a light-emitting unit 1141 and a related light-emitting driver circuit, wherein the light-emitting unit 1141 may, for example, include a plurality of light-emitting diodes (LEDs). In the present embodiment, the processing system 100B may include a processing module 116, a power control unit 117, a battery 118, and a graphics processing unit 119. The processing module 116 is coupled (electrically connected) to the display device 100A, the power control unit 117 and the graphics processing unit 119. The power control unit 117 is coupled to the battery 118 and the graphics processing unit 119. The battery 118 may also be coupled to an external power source via a power plug 100C. The processing module 116 is coupled to and controls the display screen 113, the light-emitting module 114, and the imaging element 115. The imaging element 115 may be, for example, a camera.

In the embodiment of FIG. 1C, the processing module 116 may, for example, include a central processing unit (CPU) of a notebook computer and/or related processing circuits integrated on the motherboard, and may also execute the conference program and control the display screen 113, the light-emitting module 114, the imaging element 115, the power control unit 117, and the graphics processing unit 119, wherein the power control unit 117 and the graphics processing unit 119 may include a power control circuit and a graphics processing circuit, respectively. It should be noted that each functional block and circuit shown in FIG. 1C may be used to implement the related operations described in each embodiment of the invention.

In some embodiments of the invention, the power control unit 117 may determine whether the battery power of the battery 118 is higher than a preset power threshold, so as to implement the illumination light and/or the indicating light described in each embodiment of the invention. Alternatively, the power control unit 117 may determine whether the power plug 100C may receive an external power, so as to implement the illumination light and/or the indicating light described in each embodiment of the invention. In the embodiment of FIG. 1C, the graphics processing unit 119 is configured to control the display picture content of the display screen 113, wherein, for example, a conference picture with a plurality of video panes may be displayed according to the conference program described in each embodiment of the invention (as shown in FIG. 1B).

Figure 1D:
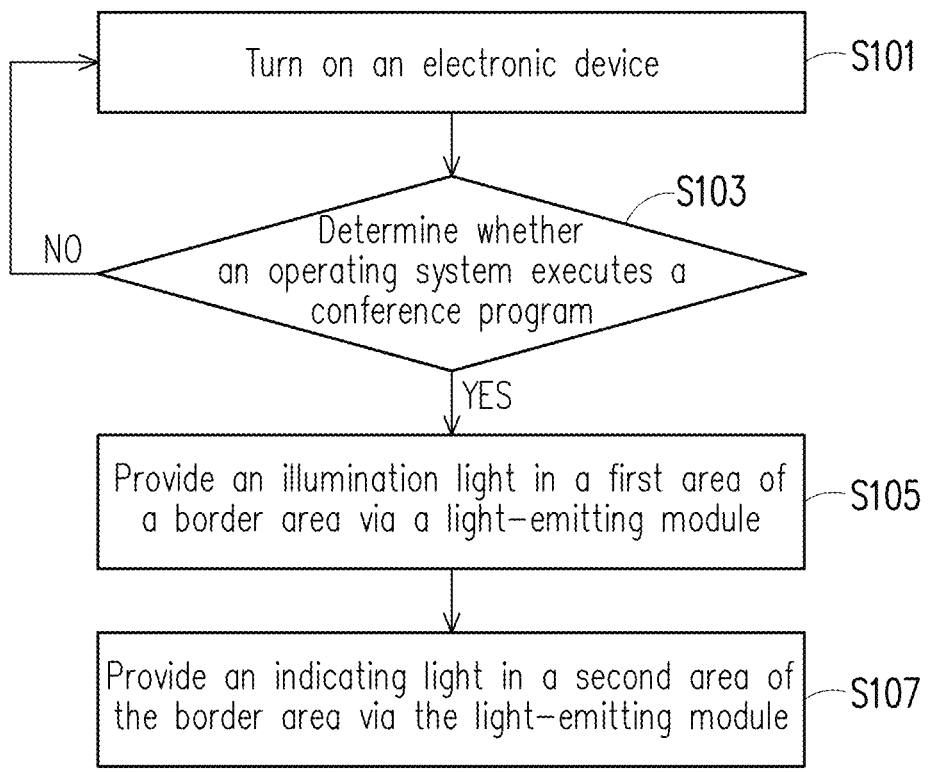
FIG. 1D is a flowchart of an operation method of an embodiment of the invention.

FIG. 1D is a flowchart of an operation method of an embodiment of the invention. Referring to FIG. 1A to FIG. 1D, the processing module 116 of the electronic device 100 may perform the following steps S101, S103, S105, and S107. First, the user 200A may press the start switch of the electronic device 100, so that the first body 101 and the second body 102 of the electronic device 100 may be operated in the open state shown in FIG. 1A. In step S101, the processing module 116 starts the electronic device 100 (booting operation). In step S103, the processing module 116 may determine whether the operating system of the electronic device 100 executes a conference program, such as the scenario example shown in FIG. 1B. In step S105, the processing module 116 may provide an illumination light supplementing the ambient brightness in the first area 112A of the border area 112 via the light-emitting module 114, which may also be referred to as "supplementary light". In step S107, the processing module 116 may provide the indicating lights I1 to I4 in the second areas 112B_1 to 112B_4 of the border area 112 via the light-emitting module. In this way, referring to FIG. 1B, the second areas 112B_1 to 112B_4 may respectively provide the corresponding indicating lights I1 to I4 according to the plurality of character images, so that an observer 200B located on the side where the second surface of the first body 101 may be observed may learn the current usage status information of the user 200A operating the electronic device 100 by seeing the indicating lights I1 to I4. In other words, the observer 200B may learn that the user 200A is in a meeting according to the indicating lights I1 to I4, so as to avoid disturbing the user 200A.

In addition to the above description, in step S103, in addition to determining whether to execute the conference program, if the conference program is executed and the current operating environment has sufficient lighting, step S105 may be ignored and step S103 directly proceeds to step S107. In other words, the current operating environment has sufficient lighting, and there is no need for the light-emitting module in the first area to provide supplementary light.

Figure 2:
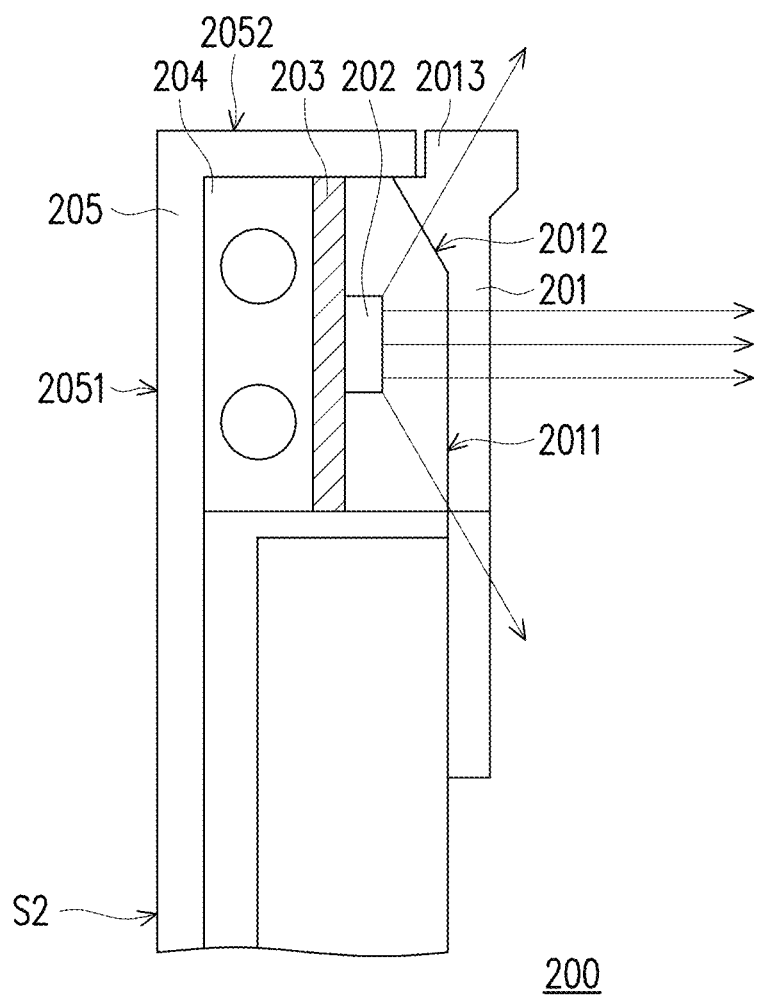
FIG. 2 is a schematic diagram of the structure of a light-emitting module of an embodiment of the invention.

FIG. 2 is a schematic diagram of the structure of a light-emitting module of an embodiment of the invention. In FIG. 2, only a portion of a first body 210A is shown, and the light-emitting module 114 may implement (a portion of) the light-emitting module of a first body 200 as shown in FIG. 2. In the embodiment of FIG. 2, the light-emitting module includes a screen border 201, a light-emitting unit 202, a light-shielding element 203, a circuit module 204, and an upper cover 205 of the first body 200. The screen border 201 is disposed in the border area of the first surface S1 of the first body 200 and surrounds the display screen. The screen border 201 is extended from the edge of the display screen 213 to one side of the first body 200 and is extended on a cover edge 2052 of the upper cover 205 of the first body 200. A cover surface 2051 of the upper cover 205 of the first body 200 is formed on a second surface S2 of the first body 200. An accommodating space is formed between the screen border 201 and the upper cover 205 of the first body 200. The light-emitting unit 202, the light-shielding element 203, and the circuit module 204 are disposed in the accommodating space. In the present embodiment, the screen border 201 includes a cover edge 2052 of a top portion 2013 relative to the upper cover 205 of the first body 200, and the inner side of the screen border 201 includes a flat surface 2011 and an inclined surface 2012 facing the light-emitting unit 202, respectively. It should be noted that the screen border 201 may be a semi-transparent plastic material or a glass material with light guiding properties. Since the light-emitting unit 202 is hidden inside the screen border 201 and is not readily noticed, the light-emitting unit 202 does not affect the aesthetics of the appearance of the apparatus.

In the present embodiment, the illumination light and/or the indicating light emitted by the light-emitting unit 202 may be incident on the screen border 201 via the flat surface 2011 and the inclined surface 2012 on the inner side of the screen border 201 to guide the illumination light and/or the indicating light outside the light-emitting module 200 via the screen border 201. In the present embodiment, the cover surface 2051 of a casing 205 of the first body is formed on the second surface S2 and includes another portion of the cover edge 2052 disposed on the side surface of the first body, and the cover surface 2051 and the cover edge 2052 are made of a non-transparent material. In some embodiments of the invention, the area of the cover edge 2052 at the other portion of the side surface of the first body is larger than the area of the top portion 2013 of the screen border 201 at the portion of the side surface of the first body. In other words, the area of the portion of the cover edge 2052 on the same side as the top portion 2013 is larger than the area of the top portion 2013. In addition, the top portion 2013 of the screen border 201 of the invention may have the following embodiments shown in FIG. 3A to FIG. 3C, for example. It should be noted that when the light-emitting unit 202 is activated, the light thereof may penetrate the screen border 201 and be softened, and the light may be guided to the top portion 2013 via the light guide material. In this way, both the front surface and the surrounding surface of the screen border 201 (the surface of the top portion 2013) may emit an illumination light or an indicating light.

Figure 3A:
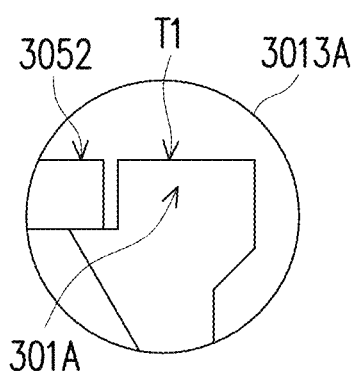
FIG. 3A is a schematic diagram of the structure of a screen border of the first embodiment of the invention.
Figure 3B:
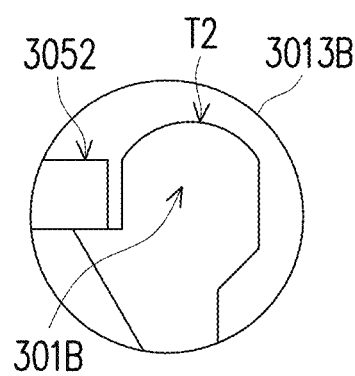
FIG. 3B is a schematic diagram of the structure of a screen border of the second embodiment of the invention.
Figure 3C:
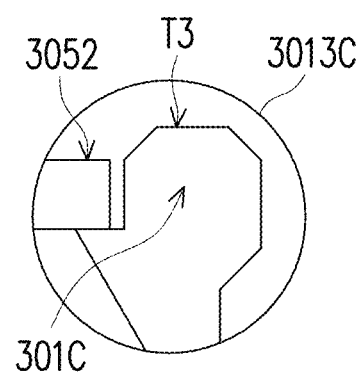
FIG. 3C is a schematic diagram of the structure of a screen border of the third embodiment of the invention.

FIG. 3A is a schematic diagram of the structure of a screen border of the first embodiment of the invention. Referring to FIG. 3A, a top portion 3013A of a screen border 301A may have a flat surface T1, and a cover edge 3052A may be level with the top portion 3013A of the screen border 301A. FIG. 3B is a schematic diagram of the structure of a screen border of the second embodiment of the invention. Referring to FIG. 3B, a top portion 3013B of a screen border 301B may have an arc-shaped surface T2, and the height of a cover edge 3052B is lower than the top portion 3013B of the screen border 301B. FIG. 3C is a schematic diagram of the structure of a screen border of the third embodiment of the invention. Referring to FIG. 3C, a top portion 3013C of a screen border 301C may have a trapezoidal surface T3, and the height of a cover edge 3052C is lower than the top portion 3013C of the screen border 301C.

Figure 4A:
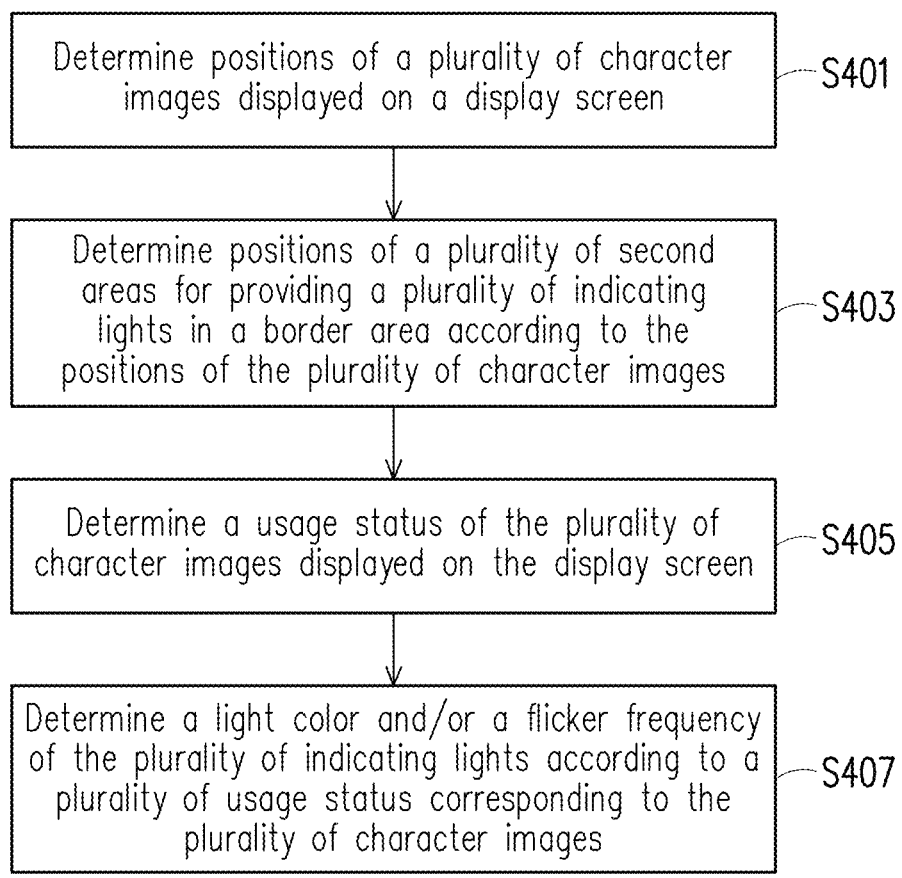
FIG. 4A is a flowchart of controlling indicating lights of an embodiment of the invention.
Figure 4B:
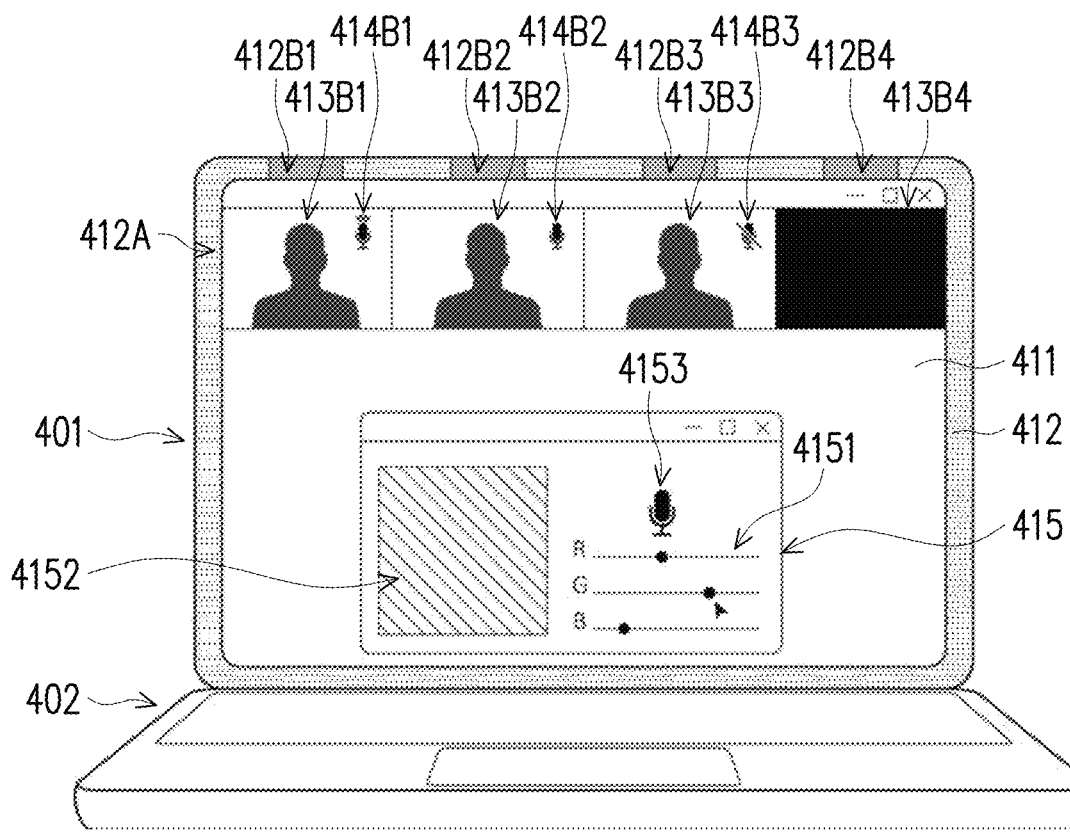
FIG. 4B is a schematic diagram of the operation of an electronic device of an embodiment of the invention.

FIG. 4A is a flowchart of controlling indicating lights of an embodiment of the invention. FIG. 4B is a schematic diagram of the operation of an electronic device of an embodiment of the invention. Referring to FIG. 4A and FIG. 4B, an electronic device 400 includes a first body 401 and a second body 402. One side of the first body 401 is pivotally connected to one side of the second body 402. The first surface of the first body 401 includes a screen area 411 and a border area 412, and the border area 412 surrounds the screen area 411. A display screen may be disposed in the screen area 411 of the first body 401. A light-emitting module may be disposed in the border area 412 of the first body 401. For other technical features of the electronic device 400 of the present embodiment, reference may be made to the description of the above embodiments of FIG. 1A to FIG. 3C, which are not repeated herein. In the present embodiment, the processing module of the electronic device 400 (refer to the processing module 116 of FIG. 1C as described above) may perform the following steps S401, S403, S405, and S407 to control the light-emitting mode of the indicating lights.

As shown in FIG. 4A, when the processing module of the electronic device 400 executes a conference program, the processing module of the electronic device 400 may turn on a plurality of light-emitting units in a first area 412A of the border area 412 to provide an illumination light. In step S401, the processing module of the electronic device 400 may determine the positions of a plurality of character images displayed on a display screen (that is, the positions of video panes 413B1 to 413B4). In step S403, the processing module of the electronic device 400 may determine the positions of a plurality of second areas 412B1 to 412B4 for providing the indicating lights in the border area 412 according to the positions of the plurality of character images. In step S405, the processing module of the electronic device 400 may determine the current usage status of the plurality of character images displayed on the display screen. In step S407, the processing module of the electronic device 400 may determine the light color and/or the flicker frequency of the plurality of indicating lights according to a plurality of usage status corresponding to the plurality of character images.

As shown in FIG. 4B, the video panes 413B1 to 413B4 may be seen from the electronic device 400 of the local user (hereinafter referred to as "local electronic device"), and these video panes respectively represent other conference participants conducting the conference program via their own electronic devices, and such visual electronic devices all include a camera element and/or a microphone element. In addition, the local electronic device may determine the corresponding usage status of each conference participant via the image input status of the camera elements and/or the voice input status of the microphone elements on the electronic devices of the other conference participants.

For example, in the first scenario, the microphone element corresponding to the video pane 413B1 is turned on, and the corresponding conference participant may be talking, for example. Therefore, the character image in the video pane 413B1 may additionally display a microphone icon 414B1 that emits a sound from the microphone, and the second area 412B1 may emit a green light and/or a fast flickering indicating light. In the second scenario, the microphone element corresponding to the video pane 413B2 is turned on, and the corresponding conference participant is not talking. Therefore, in the video pane 413B2, a microphone icon 414B2 with the microphone on may be additionally displayed next to the character image, and the second area 412B2 emits yellow light and/or a fixed light (not flickering) indicating light. In the third scenario, the microphone element corresponding to the video pane 413B3 is turned off. Therefore, a microphone icon 414B3 with the microphone turned off may be additionally displayed next to the character image in the video pane 413B3, and the second area 412B3 emits a red light and/or a slow flickering indicating light. In the fourth scenario, the microphone element corresponding to the video pane 413B4 is turned off, and the imaging element corresponding to the video pane 413B4 is turned off. Therefore, the video pane 413B4 may be displayed as a black screen, and the second area 412B4 may emit orange light or be in an off state.

It is worth noting that the light colors of the indicating lights of the invention are not limited to the above, and the light colors of the indicating lights may be manually set by the user. In some embodiments of the invention, the electronic device 400 may perform a color grading operation to further display a color grading interface 415 via the display screen. In addition, the light color of each of the indicating lights of the second areas 412B1 to 412B4 of the border area 412 of the invention may be determined according to the color grading setting result of the color grading interface 415. The color grading interface 415 may include a plurality of control slider images 4151, a color wheel image 4152, and an icon image 4153, and the icon image 4153 is configured to reflect the color grading setting result. The control slider images 4151 may correspond to color modes such as RGB, CMYK, HEX, etc., for example. In this way, the user may determine the exclusive color of the icon image 4153 by dragging the plurality of control slider images 4151 via the mouse, for example.

Figure 5:
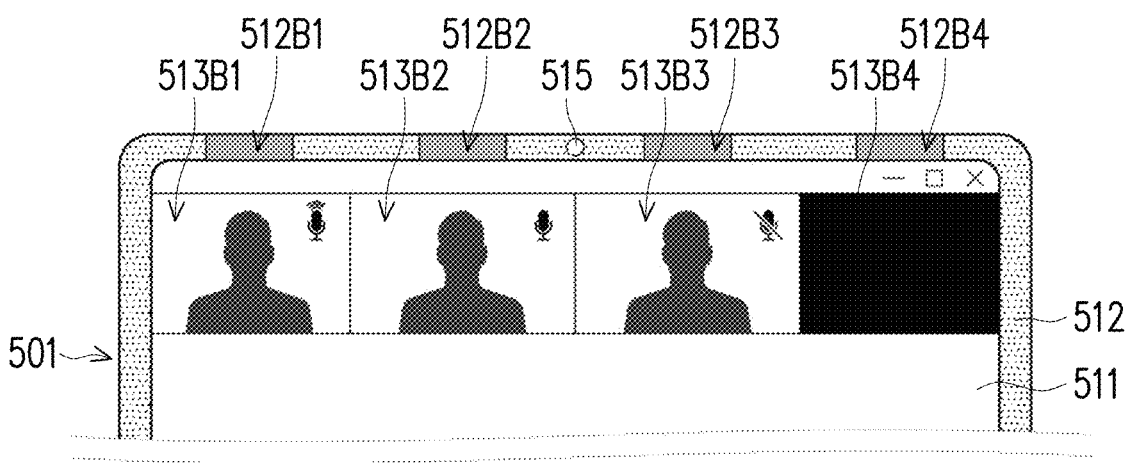
FIG. 5 is a diagram of the mounting position of a sensor of an embodiment of the invention.
Figure 6:
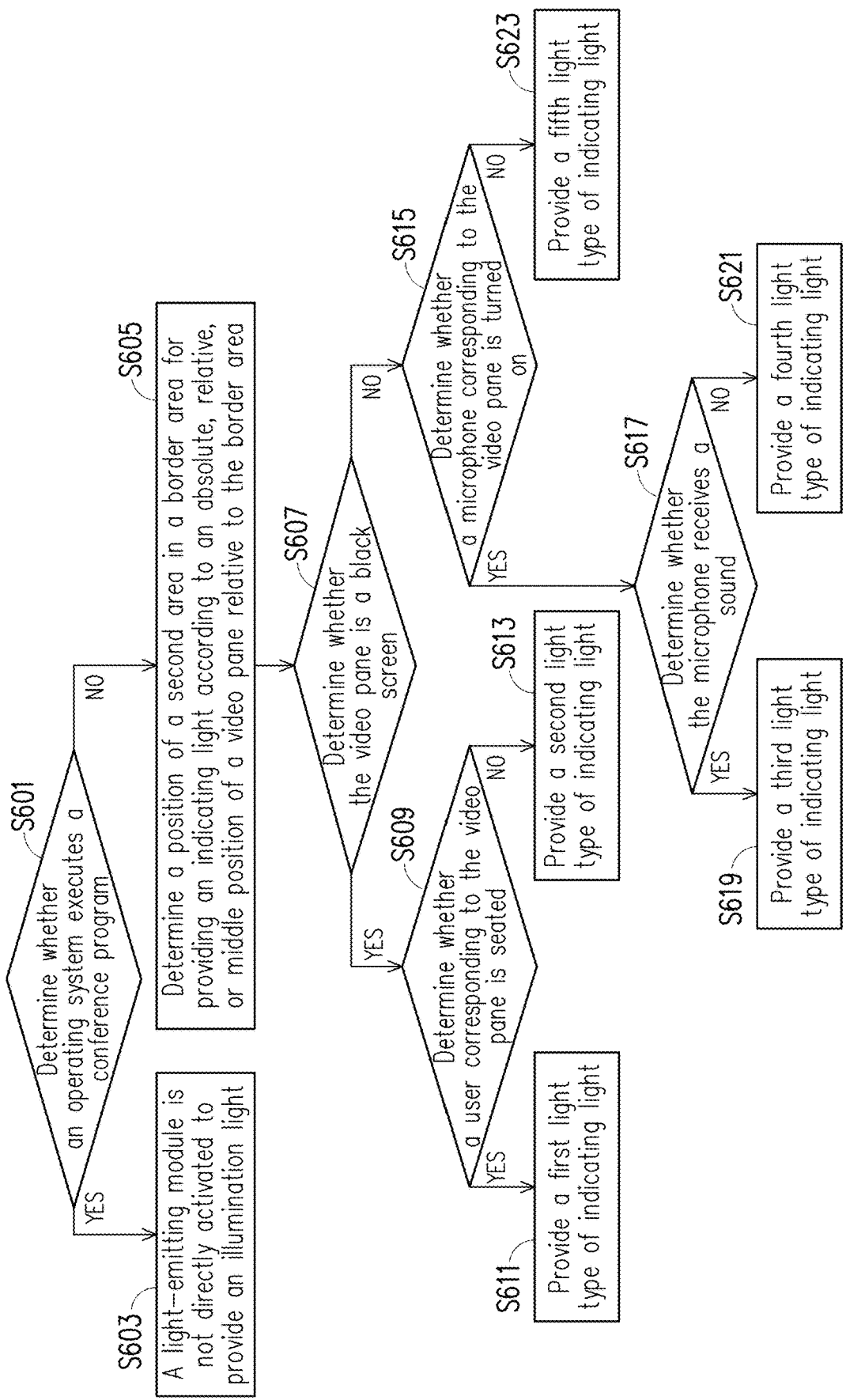
FIG. 6 is a flowchart of controlling indicating lights of another embodiment of the invention.

FIG. 5 is a diagram of the mounting position of a sensor of an embodiment of the invention. FIG. 6 is a flowchart of controlling indicating lights of another embodiment of the invention. Referring to FIG. 5 and FIG. 6, the electronic device of the present embodiment may be another implementation example of the electronic device described in the above embodiments. In the present embodiment, the electronic device capable of video conference may not only include the technical features of each of the above embodiments (i.e., the camera element and the microphone element), but may also include a sensor 515. As shown in FIG. 5, the sensor 515 may be disposed in the border area 512 of the first body 501. Accordingly, the local electronic device may sense the usage status of each conference participant via the sensor 515 on the electronic device of each conference participant to determine the light color or flicker frequency of one of second areas 512B1, 512B2, 512B3, 512B4 corresponding to the character image presented by the local electronic device. In other words, one of video panes 513B1, 513B2, 513B3, 513B4 may display a real-time character image of a conference participant captured by the camera element, and the light color or flicker frequency of one of the second areas 512B1, 512B2, 512B3, 512B4 corresponding to the real-time character image may be determined according to the sensing result of the sensor 515. The imaging element described in each embodiment of the invention (for example, the imaging element 115 of FIG. 1C) may be disposed at or near the position of the sensor 515 of FIG. 5, but the invention is not limited in this regard. In addition, the light colors or flicker frequencies of the plurality of second areas of the border area corresponding to the character images of the other conference participants may also be determined according to the sensing results of the sensors of the respective electronic devices. In addition, the electronic devices of the other conference participants may also display corresponding conference images and display corresponding light colors or flicker frequencies in the plurality of second areas of the border area. In the present embodiment, the sensor 515 may include at least one of an infrared sensor, a thermal sensor, and a microphone.

For example, the processing module of the electronic device of the present embodiment may perform steps S601 to S621 of FIG. 6. In step S601, the processing module of the electronic device of the present embodiment may determine whether the operating system executes a conference program. If step S601 determines "NO", then in step S603, the processing module of the electronic device does not directly activate a light-emitting module to provide an illumination light. Instead, the light-emitting module is activated to provide the illumination light only when the current operating environment lighting is determined to be insufficient according to user needs or the processing module. If step S601 determines "YES", then the processing module of the electronic device in step S605 may be located at an absolute, relative, or middle position relative to the border area 512 according to the video pane (i.e., the position of the character image) to adaptively determine the positions of the second areas 512B1, 512B2, 512B3, and 512B4 for providing the indicating lights in the border area 512. In step S607, the processing module of the electronic device may determine whether the video pane is a black screen (representing that the imaging element of the electronic device of the conference participant corresponding to the video pane is turned off), wherein, for example, the video pane 513B4 of FIG. 5 is a black screen. If step S607 determines "YES", then the processing module of the electronic device in step S609 may determine whether the user corresponding to the video pane is seated. Specifically, the processing module of the electronic device of the present embodiment may sense whether the conference participant corresponding to the video pane is seated via the conference program and the sensor of the electronic device of the conference participant corresponding to the video pane.

If step S609 determines "YES", then the processing module of the electronic device in step S611 may decide to provide a first light type of indicating light. For example, the processing module of the electronic device of the present embodiment may determine that the second area 512B4 corresponding to the video pane 513B4 emits the first light type of indicating light. If step S609 determines "NO", then the processing module of the electronic device in step S613 may decide to provide a second light type of indicating light. For example, the processing module of the electronic device of the present embodiment may determine that the second area 512B4 corresponding to the video pane 513B4 emits the second light type of indicating light.

In step S615, the processing module of the electronic device of the present embodiment may determine whether the microphone corresponding to the video pane is turned on, such as the video panes 513B1, 513B2, 513B3 of FIG. 5. Specifically, the processing module may determine whether the microphone is turned on via the conference program and the electronic device of the user corresponding to the video pane. If the determination in step S615 is "YES", then the processing module of the electronic device in step S617 may determine whether the microphone receives a sound. Then, if the determination in step S617 is "YES", then the processing module of the electronic device in step S619 decides to provide a third light type of indicating light, which corresponds to the second area 512B1 of the video pane 513B1 in FIG. 5 emitting the third light type of indicating light, which also means that the conference participant is speaking. If the determination in step S617 is "NO", then the processing module of the electronic device in step S621 decides to provide a fourth light type of indicating light, which corresponds to the second area 512B2 of the video pane 513B2 in FIG. 5 emitting the fourth light type of indicating light, which means that the conference participant is not speaking.

In addition, in step S615, if the processing module of the electronic device of the present embodiment determines that the microphone corresponding to the video pane is turned off, then in step S623, the processing module of the electronic device determines to provide a fifth light type of indicating light. For example, the processing module of the electronic device of the present embodiment may determine that the second area 512B3 corresponding to the video pane 513B3 emits the fifth light type of indicating light.

Figure 7:
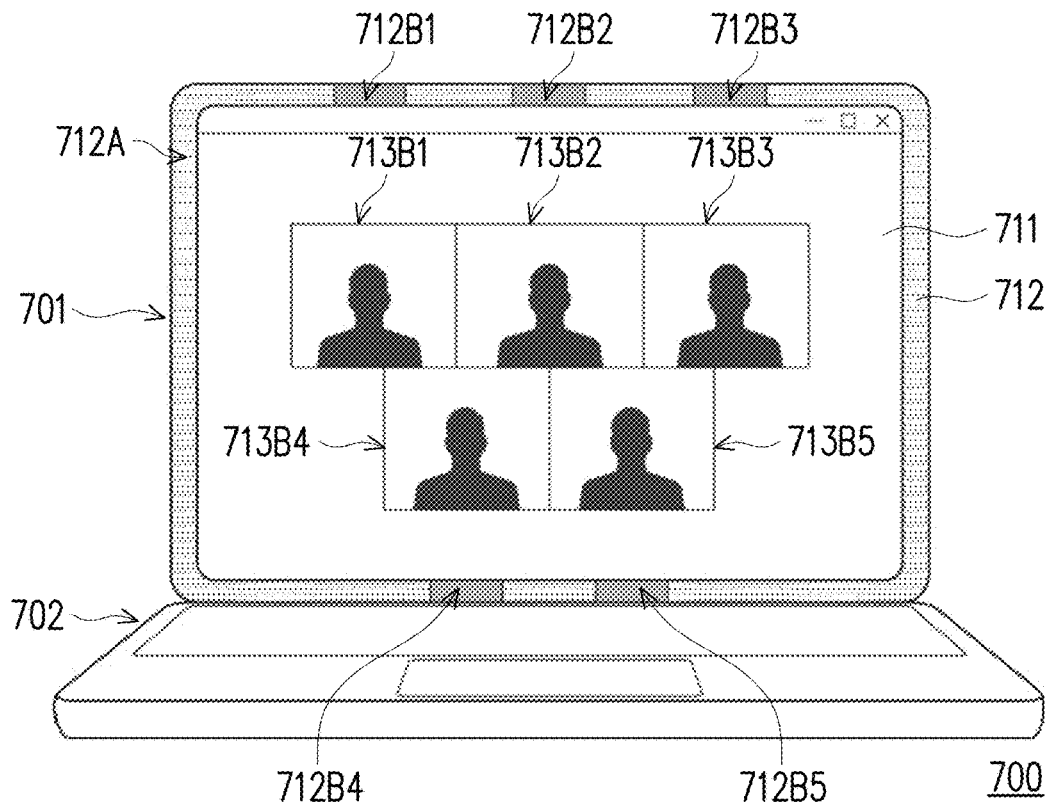
FIG. 7 is a schematic diagram of the matching operation of a conference program and indicating lights of the first embodiment of the invention.

FIG. 7 is a schematic diagram of the matching operation of a conference program and indicating lights of the first embodiment of the invention. Referring to FIG. 7, an electronic device 700 includes a first body 701 and a second body 702. One side of the first body 701 is pivotally connected to one side of the second body 702. The first surface of the first body 701 includes a screen area 711 and a border area 712, and the border area 712 surrounds the screen area 711. A display screen may be disposed in the screen area 711 of the first body 701. A light-emitting module may be disposed in the border area 712 of the first body 701. A first area 712A of the border area 712 is configured to provide an illumination light. For other technical features of the electronic device 700 of the present embodiment, reference may be made to the description of the above embodiments of FIG. 1A to FIG. 6, which are not repeated herein. In the present embodiment, the processing module of the electronic device 700 (refer to the processing module 116 of FIG. 1C above) may determine the positions of the second areas 712B1 to 712B5 for providing the indicating lights in the border area according to the "relative positions" of video panes 713B1 to 713B5 located relative to the border area 712 (as in the above step S605). As shown in FIG. 7, the video panes 713B1 to 713B3 are located in the upper row, and the video panes 713B4 to 713B5 are located in the lower row. Therefore, the processing module of the electronic device 700 may operate a plurality of light-emitting units in the positions of the second areas 712B1 to 712B5 of the upper and lower border areas 712 of the relative position to emit the indicating lights.

In addition, in some other embodiments of the invention, the processing module of the electronic device 700 may also determine whether the current ambient light is sufficient to selectively turn on or not turn on the other light-emitting units in the first area 712A of the border area 712 that do not correspond to the video panes 713B1 to 713B5 to provide an illumination light. In addition, the other blank areas of the screen area 711 may be other working areas used as picture sharing areas or other video areas of the user.

Figure 8:
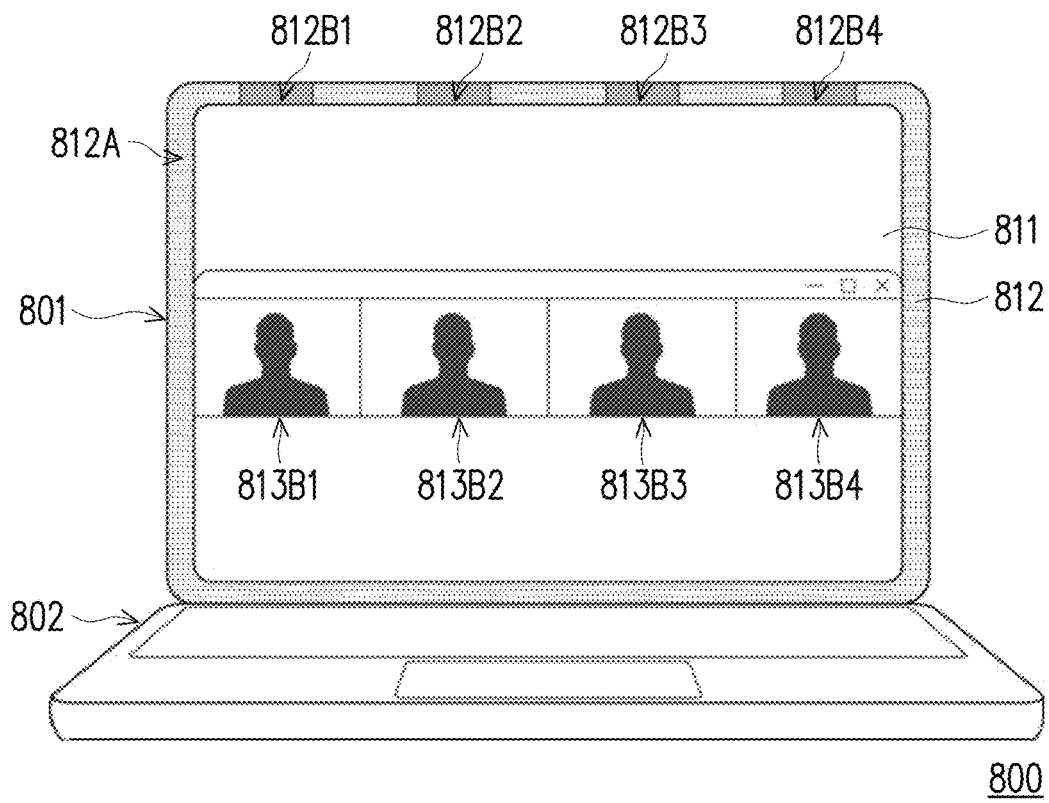
FIG. 8 is a schematic diagram of the matching operation of a conference program and indicating lights of the second embodiment of the invention.

FIG. 8 is a schematic diagram of the matching operation of a conference program and indicating lights of the second embodiment of the invention. Referring to FIG. 8, an electronic device 800 includes a first body 801 and a second body 802. One side of the first body 801 is pivotally connected to one side of the second body 802. The first surface of the first body 801 includes a screen area 811 and a border area 812, and the border area 812 surrounds the screen area 811. A display screen may be disposed in the screen area 811 of the first body 801. A light-emitting module may be disposed in the border area 812 of the first body 801. A first area 812A of the border area 812 is configured to provide an illumination light. For other technical features of the electronic device 800 of the present embodiment, reference may be made to the description of the above embodiments of FIG. 1A to FIG. 6, which are not repeated herein. In the present embodiment, the processing module of the electronic device 800 (refer to the processing module 116 of FIG. 1C above) may determine the positions of the second areas 812B1 to 812B4 for providing the indicating lights in the border area according to the "middle positions" of video panes 813B1 to 813B4 located in the screen area 811 (as in the above step S605). As shown in FIG. 8, the video panes 813B1 to 813B4 are located at the middle position of the screen area 811. Therefore, the processing module of the electronic device 800 may operate a plurality of light-emitting units at the positions of the second areas 812B1 to 812B4 above the border area 812 to emit the indicating lights. Alternatively, the processing module of the electronic device 800 may operate the plurality of light-emitting units at the positions of the plurality of second areas below the border area 812 to emit the indicating lights. In this regard, from another perspective, if the indicating lights are emitted below the border area 812, observers around the user may not learn the user's usage, so privacy may be maintained.

Figure 9A:
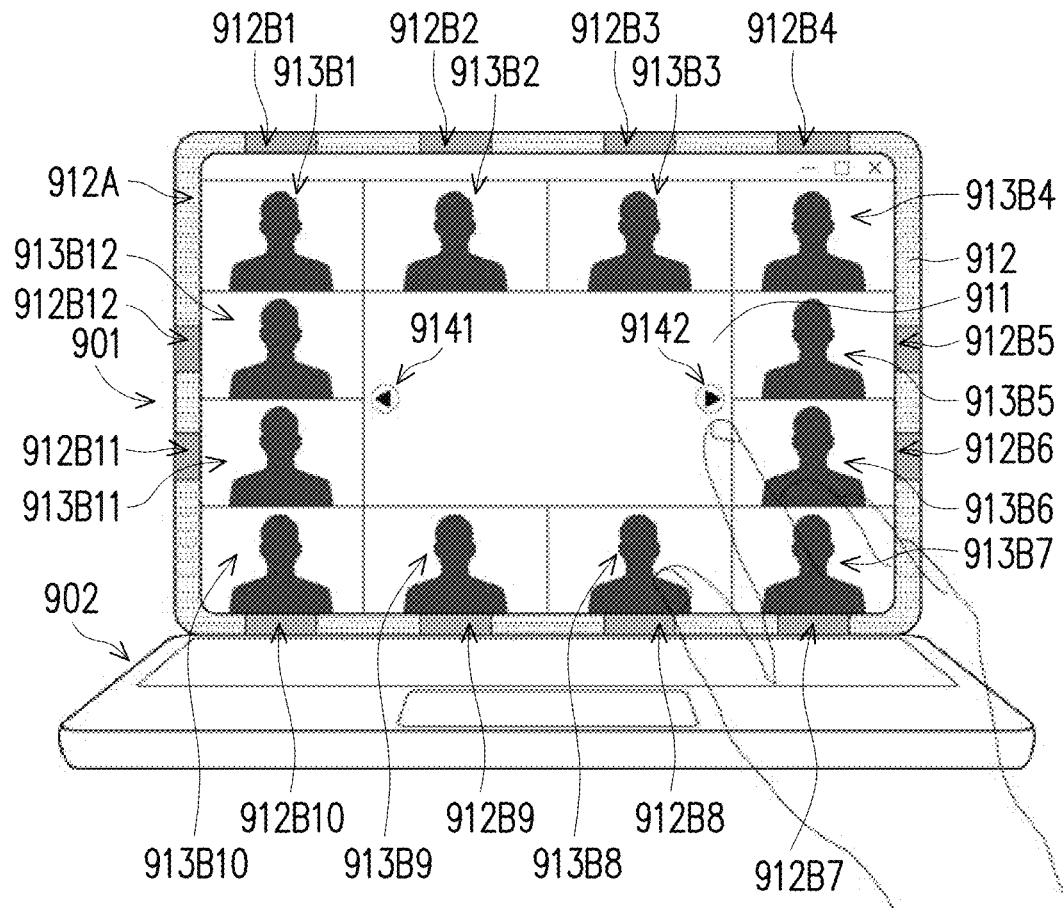
FIG. 9A is a schematic diagram of the matching operation of a conference program and indicating lights of the third embodiment of the invention.

FIG. 9A is a schematic diagram of the matching operation of a conference program and indicating lights of the third embodiment of the invention. Referring to FIG. 9A, an electronic device 900 includes a first body 901 and a second body 902. One side of the first body 901 is pivotally connected to one side of the second body 902. The first surface of the first body 901 includes a screen area 911 and a border area 912, and the border area 912 surrounds the screen area 911. A display screen may be disposed in the screen area 911 of the first body 901. A light-emitting module may be disposed in the border area 912 of the first body 901. A first area 912A of the border area 912 is configured to provide an illumination light. For other technical features of the electronic device 900 of the present embodiment, reference may be made to the description of the above embodiments of FIG. 1A to FIG. 6, which are not repeated herein. In the present embodiment, the processing module of the electronic device 900 (refer to the processing module 116 of FIG. 1C above) may determine the positions of the second areas 912B1 to 912B12 for providing the indicating lights in the border area according to the "absolute positions" of video panes 913B1 to 913B12 located relative to the border area 912 (as in the above step S605). As shown in FIG. 9A, the video panes 913B1 to 913B12 are located in the screen area 911 and disposed along the border area 912. Therefore, the processing module of the electronic device 900 may operate a plurality of light-emitting units in the positions of the second areas 912B1 to 912B12 of the border area 912 at the absolute position to emit the indicating lights.

Figure 9B:
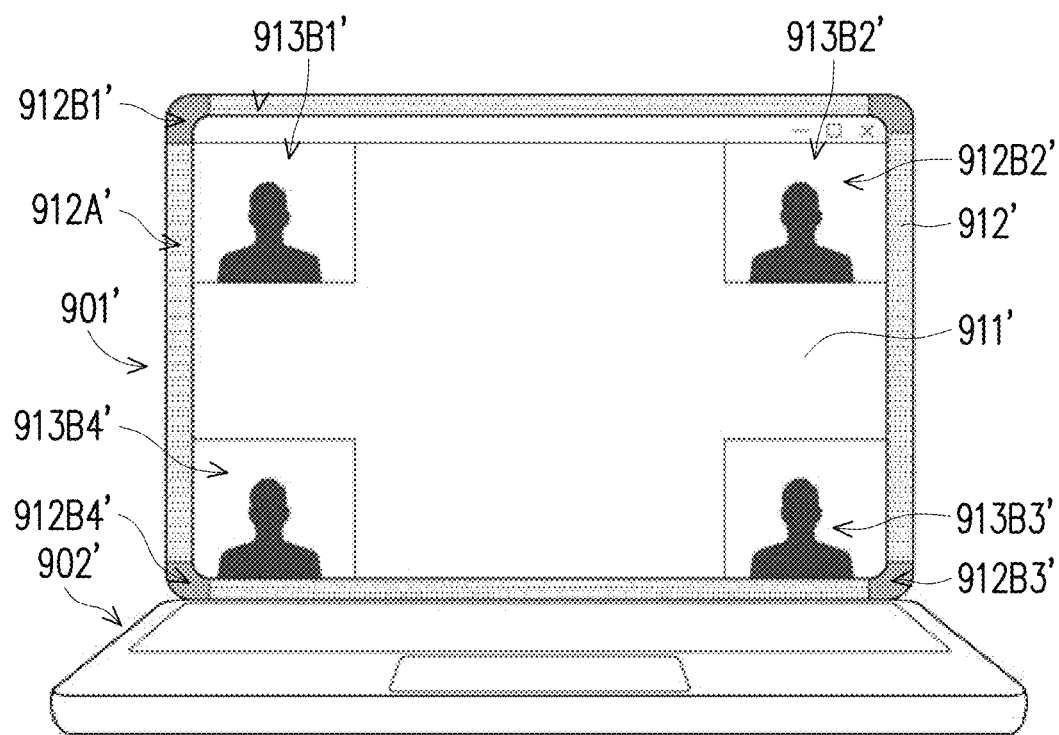
FIG. 9B is a schematic diagram of the matching operation of a conference program and indicating lights of the fourth embodiment of the invention.

In addition, the number and positions of the video panes 913B1 to 913B12 of the present embodiment are not limited to those in FIG. 9A. The video panes 913B1 to 913B12 may also be located at absolute positions of at least one of the upper, lower, left, right, and corner positions in the screen area 911 along the border area 912. For example, FIG. 9B is a schematic diagram of the matching operation of a conference program and indicating lights of the fourth embodiment of the invention. An electronic device 900' includes a first body 901' and a second body 902'. One side of the first body 901' is pivotally connected to one side of the second body 902'. The first surface of the first body 901' includes a screen area 911' and a border area 912'. The border area 912' includes a first area 912A' and second areas 912B1' to 912B4'. The video panes 913B1' to 913B4' may be located at the four corners of the screen area 911', and the second areas 912B1' to 912B4' of the border area 912' may be located at the four corners of the border area 912' accordingly to correspond to the positions of the video panes 913B1' to 913B4'.

In addition, in FIG. 9A, if there are too many video panes to be displayed on the same display screen, then the conference program of the present embodiment may disperse a plurality of video panes on a plurality of conference pages, and page turning icons 9141 and 9142 may be provided for the user to perform a page turning operation by touching the display screen with their fingers or by operating a mouse or a keyboard.

Based on the above, the electronic device with an auxiliary lighting function and the operation method thereof of the invention may provide the illumination light and the indicating light at the same time via the light-emitting module disposed in the border area around the display screen. In addition, the light color, the flicker frequency, and the light-emitting position in the border area of the indicating light provided by the electronic device of the invention may be changed according to the position of the currently displayed display picture, the change in the character image, and the corresponding sensor detection result. Therefore, the electronic device and the operation method thereof of the present embodiment may effectively provide the illumination light and the indicating light, so that the user may have a good user experience in the process of operating the electronic device for a conference program.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. An electronic device with an auxiliary lighting function, comprising:
   a first body having a first surface, wherein the first surface comprises a screen area and a border area, and the border area surrounds the screen area;
   a display screen disposed in the screen area of the first body; and
   a light-emitting module disposed in the border area of the first body, wherein the light-emitting module provides an illumination light in at least one first area of the border area, and provides an indicating light in at least one second area of the border area,
   wherein when an operating system executed by the electronic device executes a conference program and displays a plurality of video panes on the display screen, the light-emitting module provides a plurality of indicating lights in a plurality of second areas of the border area,
   wherein positions of the second areas respectively correspond to the plurality of video panes to indicate a plurality of usage status corresponding to the video panes via the indicating lights,
   wherein a light color or a flicker frequency of the indicating lights is respectively determined according to the usage status corresponding to the video panes.

2. The electronic device of claim 1, wherein the light-emitting module comprises:
   a screen border disposed in the border area of the first body to surround the display screen, wherein the screen border is a light guide material; and
   a light-emitting unit disposed on an inner side of the border area of the first body and configured to emit the illumination light and the indicating light via the screen border.

3. The electronic device of claim 2, wherein the screen border comprises a top portion located relative to a portion of a side surface of the first body, and an inner side of the screen border comprises a flat surface and an inclined surface respectively facing the light-emitting unit,
   wherein the illumination light, the indicating light, or the illumination light and the indicating light emitted by the light-emitting unit is incident on the screen border via the flat surface and the inclined surface of the inner side of the screen border to guide the illumination light, the indicating light, or the illumination light and the indicating light to outside the light-emitting module via the screen border.

4. The electronic device of claim 3, wherein the first body comprises an upper cover and a second surface, the second surface is parallel to the first surface, a cover surface of the upper cover is formed on the second surface, and a cover edge of the upper cover is disposed on another portion of the side surface, and the cover edge and the upper cover are made of a non-transparent material,
   wherein an area of the cover edge at the other portion of the side surface is larger than an area of the top portion of the screen border at the portion of the side surface.

5. The electronic device of claim 4, wherein the top portion of the screen border has a flat surface, and the upper cover is level with the top portion of the screen border.

6. The electronic device of claim 4, wherein the top portion of the screen border has an arc-shaped surface or a trapezoidal surface, and a height of the upper cover is lower than the top portion of the screen border.

7. The electronic device of claim 1, wherein the illumination light is a white light, and the indicating light is a non-white color light.

8. The electronic device of claim 1, wherein the usage status are respectively responsive to a corresponding sound input status and a corresponding image input status.

9. The electronic device of claim 1, wherein the electronic device performs a color grading operation to further display a color grading interface via the display screen, and the light color of the indicating lights is determined according to a color grading setting result of the color grading interface,
wherein the color grading interface comprises a plurality of control slider images, a color wheel image, and an icon image, and the icon image is configured to reflect the color grading setting result.

10. The electronic device of claim 1, wherein the electronic device performs a detection operation to detect positions of the video panes displayed on the display screen by the conference program to adaptively determine the positions of the second areas.

11. The electronic device of claim 1, wherein the first body further comprises a sensor, and the sensor is disposed in the border area of the first body, wherein the sensor is configured to sense a local use status to determine the light color or the flicker frequency corresponding to one of the second areas of a local video pane.

12. The electronic device of claim 11, wherein the sensor comprises at least one of an infrared sensor, a thermal sensor, and a microphone.

13. The electronic device of claim 1, wherein the positions of the second areas are respectively closest to the corresponding video panes.

14. An operation method suitable for an electronic device with an auxiliary lighting function, wherein the electronic device comprises a first body, a display screen, and a light-emitting module, and the display screen is disposed in a screen area of the first body, and the light-emitting module is disposed in a border area of the first body, wherein the operation method comprises:
determining whether an operating system executed by the electronic device executes a conference program;
when the conference program is executed and a plurality of video panes are displayed on the display screen, and providing an illumination light in at least one first area of the border area and providing a plurality of indicating lights in a plurality of second areas of the border area via the light-emitting module, when the conference program is executed, wherein positions of the second areas respectively correspond to the video panes to indicate a plurality of usage status corresponding to the video panes via the indicating lights;
determining a light color or a flicker frequency of the indicating lights according to the usage status corresponding to the video panes, respectively.

15. The operation method of claim 14, wherein the usage status are respectively responsive to a corresponding sound input status and a corresponding image input status.

16. The operation method according to claim 14, further comprising:
performing a color grading operation to display a color grading interface via the display screen; and
determining the light color of the indicating lights according to a color grading setting result of the color grading interface,
wherein the color grading interface comprises a plurality of control slider images, a color wheel image, and an icon image, and the icon image is configured to reflect the color grading setting result.

17. The operation method of claim 15, further comprising:
performing a detection operation to detect positions of the video panes displayed on the display screen by the conference program to adaptively determine the positions of the second areas.

18. The operation method of claim 14, wherein the first body further comprises a sensor, and the sensor is disposed in the border area of the first body, wherein the operation method further comprises:
sensing a local usage status via the sensor to determine the light color or the flicker frequency corresponding to one of the second areas of a local video pane.

* * * * *